(12) United States Patent  
Lii et al.

(10) Patent No.: US 8,149,219 B2  
(45) Date of Patent: Apr. 3, 2012

(54) TOUCHPAD WITH SINGLE-LAYERED PRINTED CIRCUIT BOARD STRUCTURE

(75) Inventors: Jia-Yih Lii, Taichung (TW); Yen-Chang Chiu, Linkou Shiang (TW); Yung-Lieh Chien, Taoyuan (TW)

(73) Assignee: Elan Microelectronics Corporation, Hsinchu (TW)

( * ) Notice: Subject to any disclaimer, the term of this patent is extended or adjusted under 35 U.S.C. 154(b) by 867 days.

(21) Appl. No.: 11/274,178

(22) Filed: Nov. 16, 2005

(65) Prior Publication Data

US 2006/0202970 A1    Sep. 14, 2006

(30) Foreign Application Priority Data

Mar. 11, 2005 (TW) ............................... 94107545 A

(51) Int. Cl.  
*G06F 3/041* (2006.01)

(52) U.S. Cl. .................. 345/173; 345/174; 178/18.01; 178/18.05; 178/18.07

(58) Field of Classification Search ............... 345/173, 345/174, 177, 178; 178/18.01, 18.03, 18.05, 178/18.07; 463/37, 38  
See application file for complete search history.

(56) References Cited

U.S. PATENT DOCUMENTS

| 5,010,774 | A  | * | 4/1991  | Kikuo et al. ........... 73/862.046 |
| 5,543,588 | A  | * | 8/1996  | Bisset et al. ............. 178/18.06 |
| 5,854,625 | A  | * | 12/1998 | Frisch et al. ................. 345/173 |
| 6,188,391 | B1 | * | 2/2001  | Seely et al. .................. 345/173 |
| 6,819,316 | B2 | * | 11/2004 | Schulz et al. ................ 345/174 |
| 2004/0032401 | A1 | * | 2/2004 | Nakazawa et al. ........... 345/173 |
| 2004/0178997 | A1 | * | 9/2004 | Gillespie et al. ............. 345/173 |
| 2005/0035953 | A1 | * | 2/2005 | Woolley et al. .............. 345/173 |
| 2006/0038791 | A1 | * | 2/2006 | Mackey ........................ 345/173 |

* cited by examiner

*Primary Examiner* — Lun-Yi Lao  
*Assistant Examiner* — Shaheda A Abdin  
(74) *Attorney, Agent, or Firm* — Rosenberg, Klein & Lee

(57) ABSTRACT

In a touchpad with single-layered PCB structure, a PCB has a bottom layer with a sensor area and a component area thereon, the sensor area includes two directional traces directly connected to the component area, respectively, and carbon film wires in the sensor area for interconnecting one or more of the directional traces.

7 Claims, 11 Drawing Sheets

TOUCHPAD WITH SINGLE-LAYERED PRINTED CIRCUIT BOARD STRUCTURE

FIELD OF THE INVENTION

The present invention is generally related to a touchpad and, more particularly, to a touchpad with single-layered printed circuit board (PCB) structure.

BACKGROUND OF THE INVENTION

Touchpads have been widely used in electronic products including portable computers, personal digital assistants (PDAs), mobile phones, and other electronic systems. By sliding or touching on the operation area of a touchpad with a finger or other object, the relative movement or absolute coordinate movement of a cursor, or other extended functions such as simulated buttons, may be implemented. A conventional touchpad is constructed by a four-layered printed circuit board (PCB) structure, as shown by a cross-sectional view of FIG. 1, which comprises X-directional traces 104 provided in a first layer of a PCB 102, Y-directional traces 108 provided in a second layer of the PCB 102, an insulator layer 106 between the X-directional traces 104 and the Y-directional traces 108, a ground layer 112 provided in a third layer of the PCB 102, an insulator layer 110 between the Y-directional traces 108 and the ground layer 112, a component layer 118 in a fourth layer of the PCB 102, an insulator layer 114 between the ground layer 112 and the component layer 118, and an insulator cover 122 over the PCB 102 for providing an operation area thereon. The X-directional traces 104 and the Y-directional traces 108 are connected to the component layer 118 via through-holes 116 and 120, respectively. Although the ground layer 112 is proven not necessary by experiments, thereby simplifying the four-layered PCB structure to three-layered structure, the cost of such touchpad is still not reduced effectively.

For cost down, it was developed a touchpad with two-layered PCB structure, whose cross-sectional view is shown in FIG. 2. Such touchpad comprises X-directional traces 204 as shown in FIG. 3A, located in the top layer of a PCB 202, Y-directional traces 208 as shown in FIG. 3B, together with a component area 210 on the periphery therearound located in the bottom layer of the PCB 202, an insulator layer 206 between the X-directional traces 204 and the Y-directional traces 208 together with the component area 210, and an insulator cover 214 over the PCB 202 for providing an operation area thereon. The X-directional traces 204 are connected to the component area 210 via through-holes 212, while the Y-directional traces 204 are connected to the component area 210 directly without through-holes. A top view of the PCB 202 shown in FIG. 2 is provided in FIG. 4 in which the X-directional traces 204 and the Y-directional traces 208 are located in corresponding areas in the top layer and bottom layer, respectively, of the PCB 202, and the component area 210 is located in the peripheral area around the Y-directional traces 208 in the bottom layer. FIG. 5 shows a structural diagram of the bottom layer of the PCB 202 illustrated in FIG. 2 in which, the X-directional traces are connected to a controller 216 in the component area 210 via the through-holes 212 and further to other components 218, while the Y-directional traces 208 are directly connected to the controller 216 in the component area 210 and further to the other components 218.

To maintain the two-layered PCB structure and four-layered PCB structure have substantially the same area such that they could be replaced with each other without any change of mechanism design for convenient modulization, it is further developed a two-layered structure having a cross-sectional view as ahown in FIG. 6, which comprises X-directional traces 604 and Y-directional traces 606 both provided in the top layer of a PCB 602, a component area 616 provided in the bottom layer of the PCB 602, an insulator layer 608 between the X-directional traces 604 and the Y-directional traces 606 together with the component layer 616, and an insulator cover 614 over the PCB 602 for providing an operation area thereon. Due to the X-directional traces 604 and the Y-directional traces 606 both in the top layer of the PCB 602, they need through-holes 618 and 620 to connect to the component area 616 in the bottom layer, respectively. Moreover, for the purpose of avoiding short circuit resulted from the intersections of the X-directional traces 604 and the Y-directional traces 606, the Y-directional traces 606 are not directly interconnected therebetween, but interconnected with carbon film wires 612 formed by carbon ink printing. An insulator 610 is additionaly provided between the X-directional traces 604 and the carbon film wires 612 to avoid short circuit therebetween. FIG. 7 is a structural diagram of the top layer of the PCB 602 having the carbon film wires 612 to interconnect the Y-directional traces 606. Although the touchpad with two-layered PCB structure has lower cost than that of the touchpad with four-layered PCB structure, it is still not enough to satisfy the requirement of users on the price. Additionally, the carbon film wires printed on the two-layered PCB structure will be worn out as it is used, resulting in shorter lifetime of the touchpad.

Therefore, it is desired a touchpad with single-layered PCB structure to havelower cost and longer lifetime.

SUMMARY OF THE INVENTION

An object of the present invention is to provide a low cost touchpad constructed with single-layered PCB structure.

Another object of the present invention is to provide a long lifetime touchpad constructed with single-layered PCB structure.

In a touchpad with single-layered PCB structure, according to the present invention, a PCB has a bottom layer with a sensor area and a component area thereon, the sensor area includes two directional traces directly connected to the component area, respectively, and those of traces not interconnected therebetween in the sensor area are interconnected by carbon film wires.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
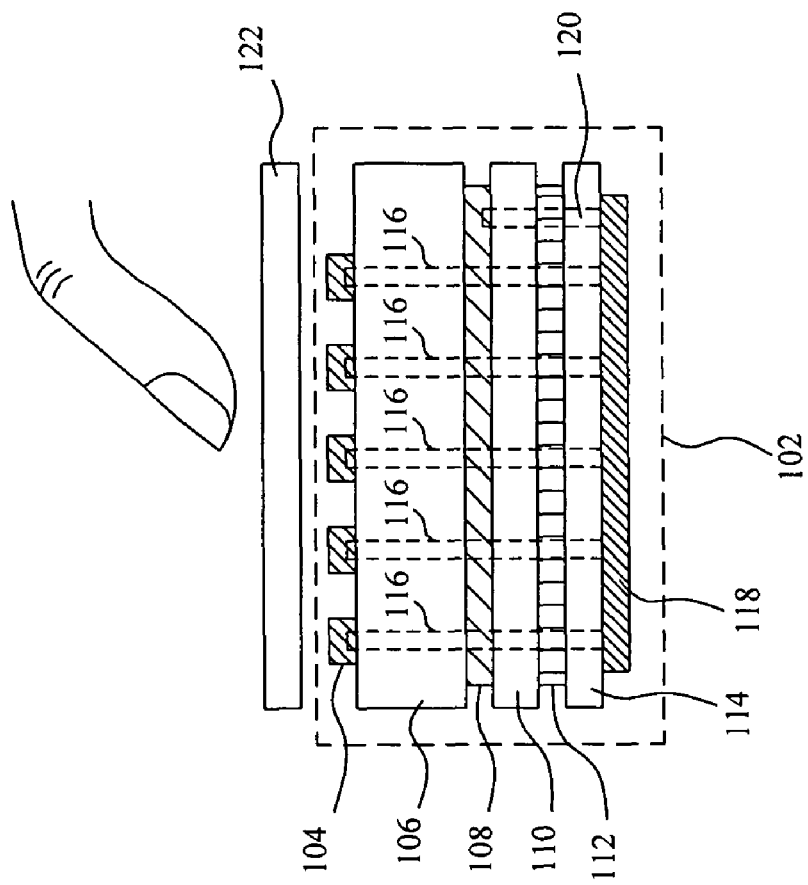
FIG. 1 is a cross-sectional view of a conventional touchpad with four-layered PCB structure.
Figure 2:
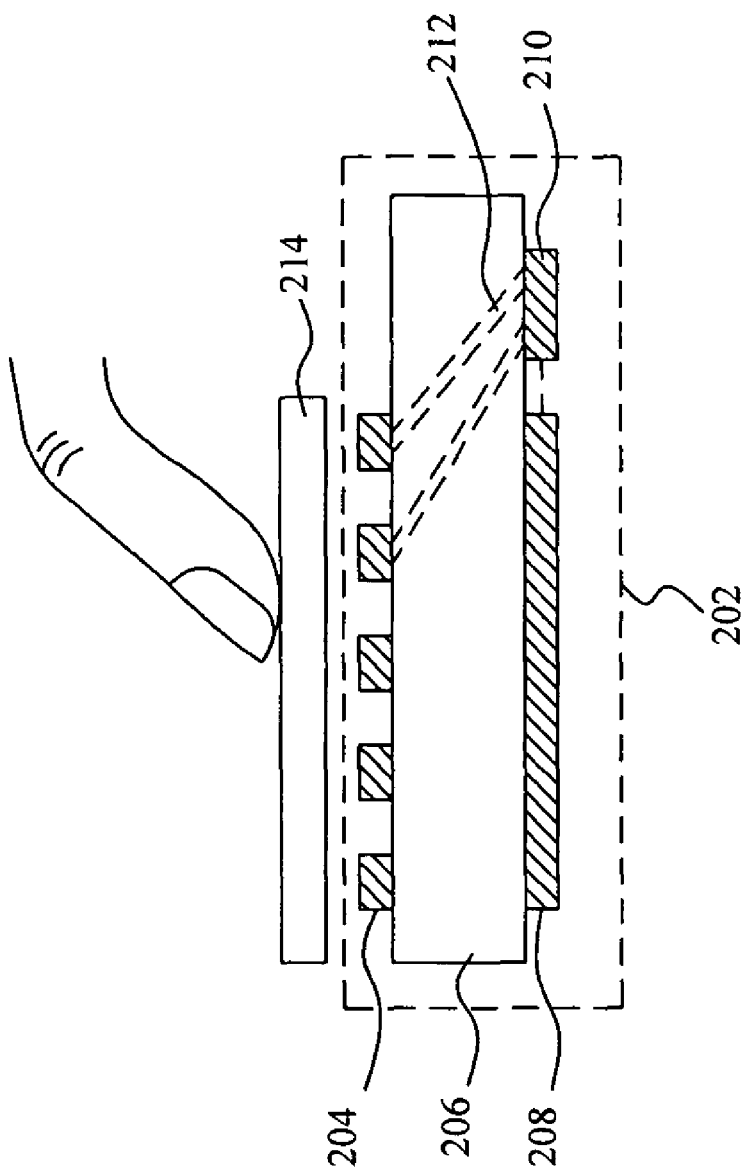
FIG. 2 is a cross-sectional view of a conventional touchpad with two-layered PCB structure.
Figure 3B:
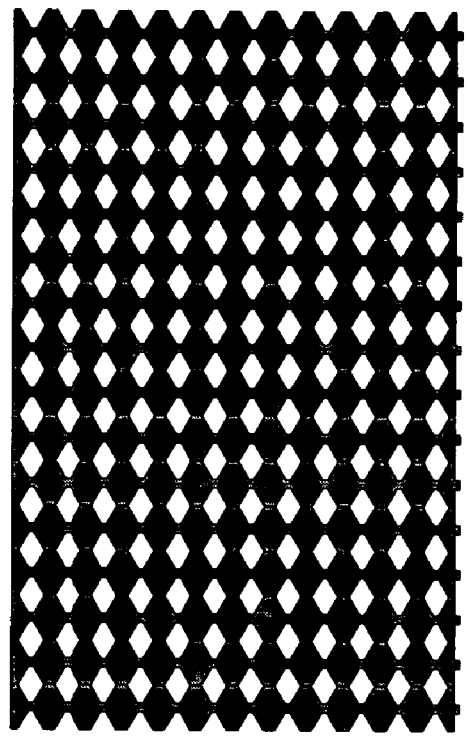
FIG. 3B is a diagram showing Y-directional traces.
Figure 3A:
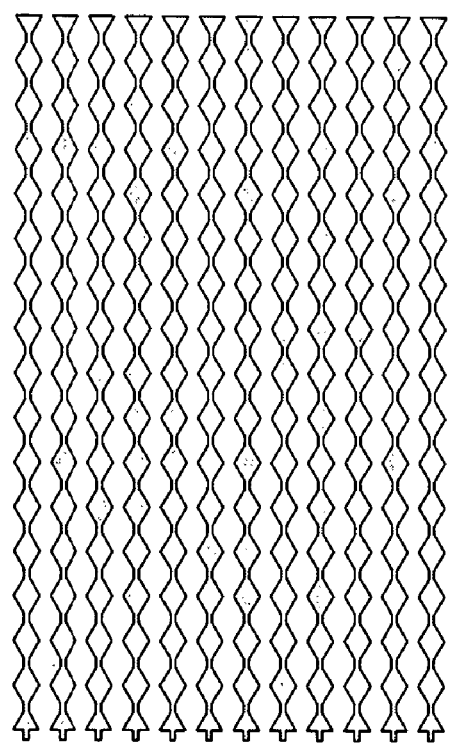
FIG. 3A is a diagram showing X-directional traces.
Figure 4:
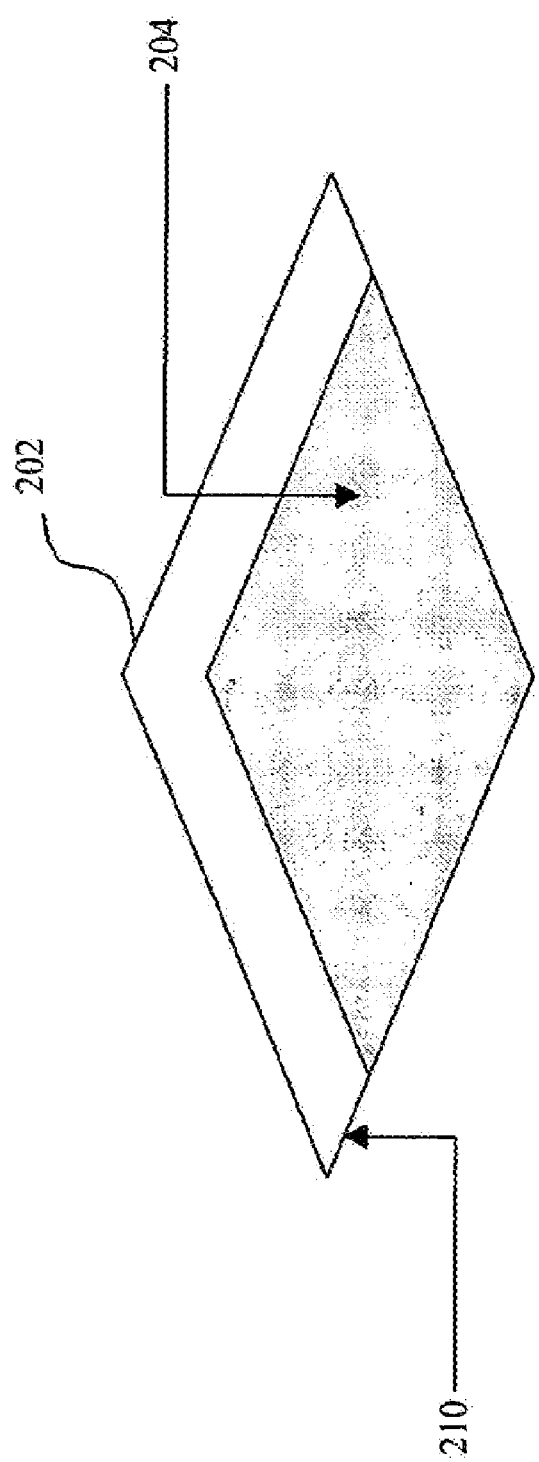
FIG. 4 is a top view of the PCB shown in FIG. 2.
Figure 5:
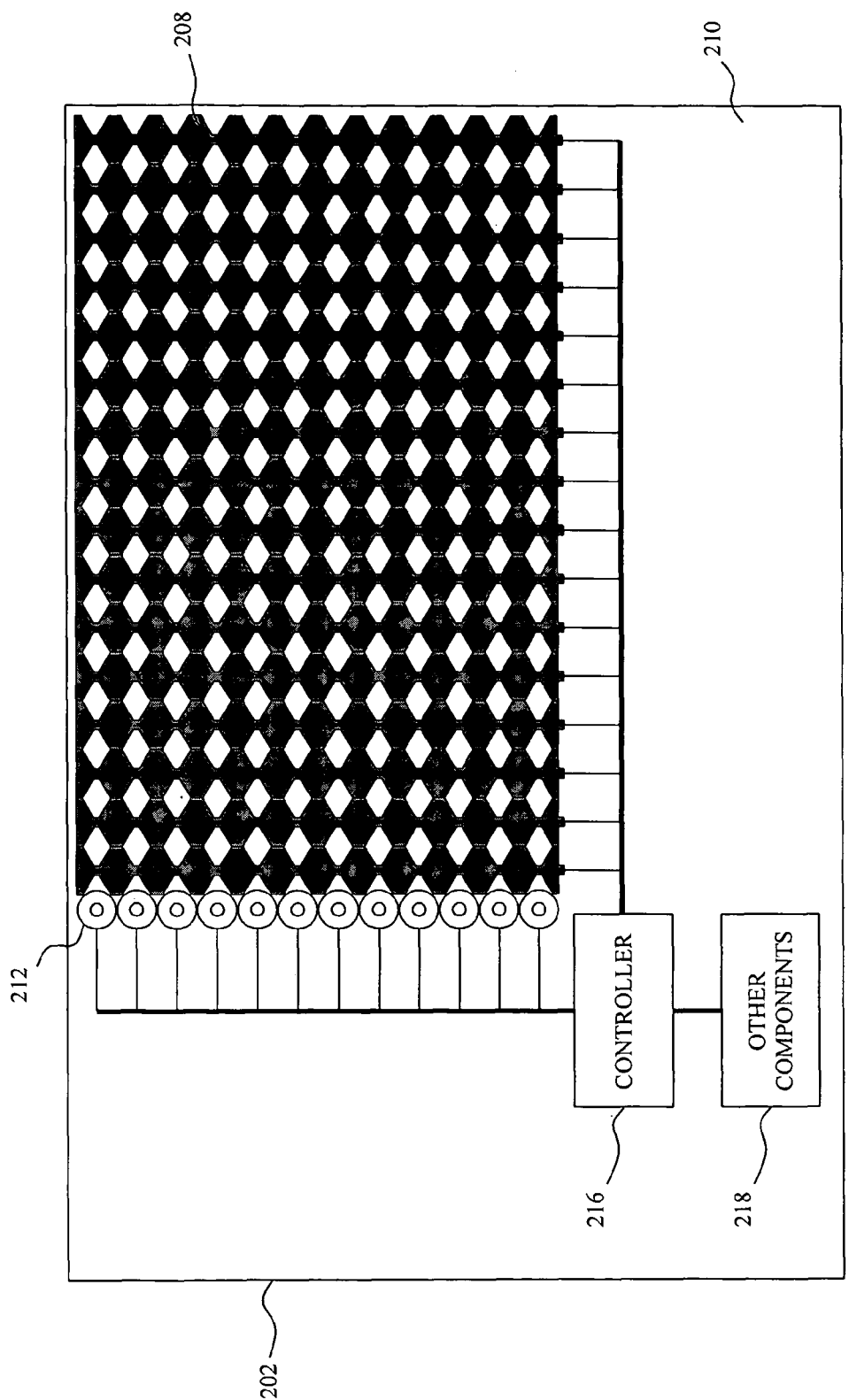
FIG. 5 is a structural diagram of a bottom layer of the PCB shown in FIG. 2.
Figure 6:
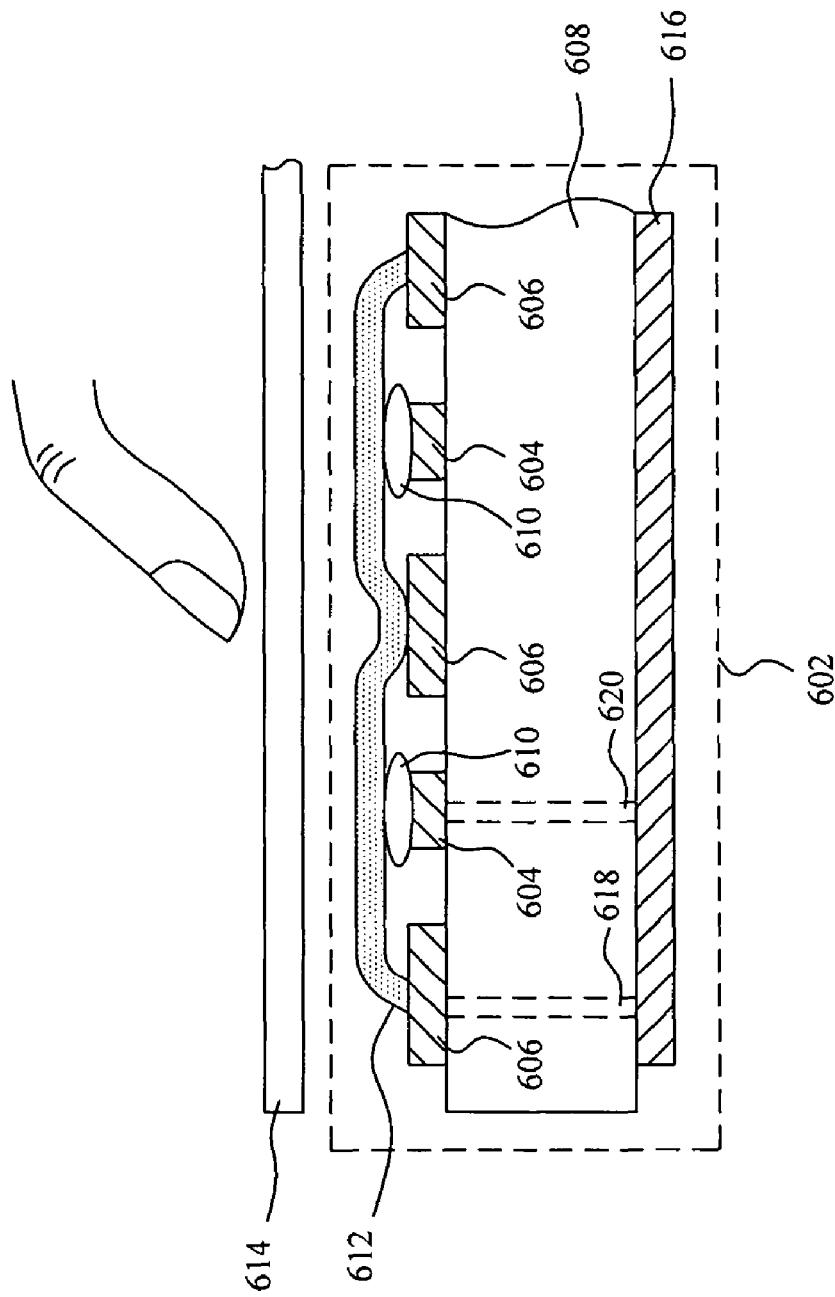
FIG. 6 is a cross-sectional view of another conventional touchpad with two-layered PCB structure.
Figure 7:
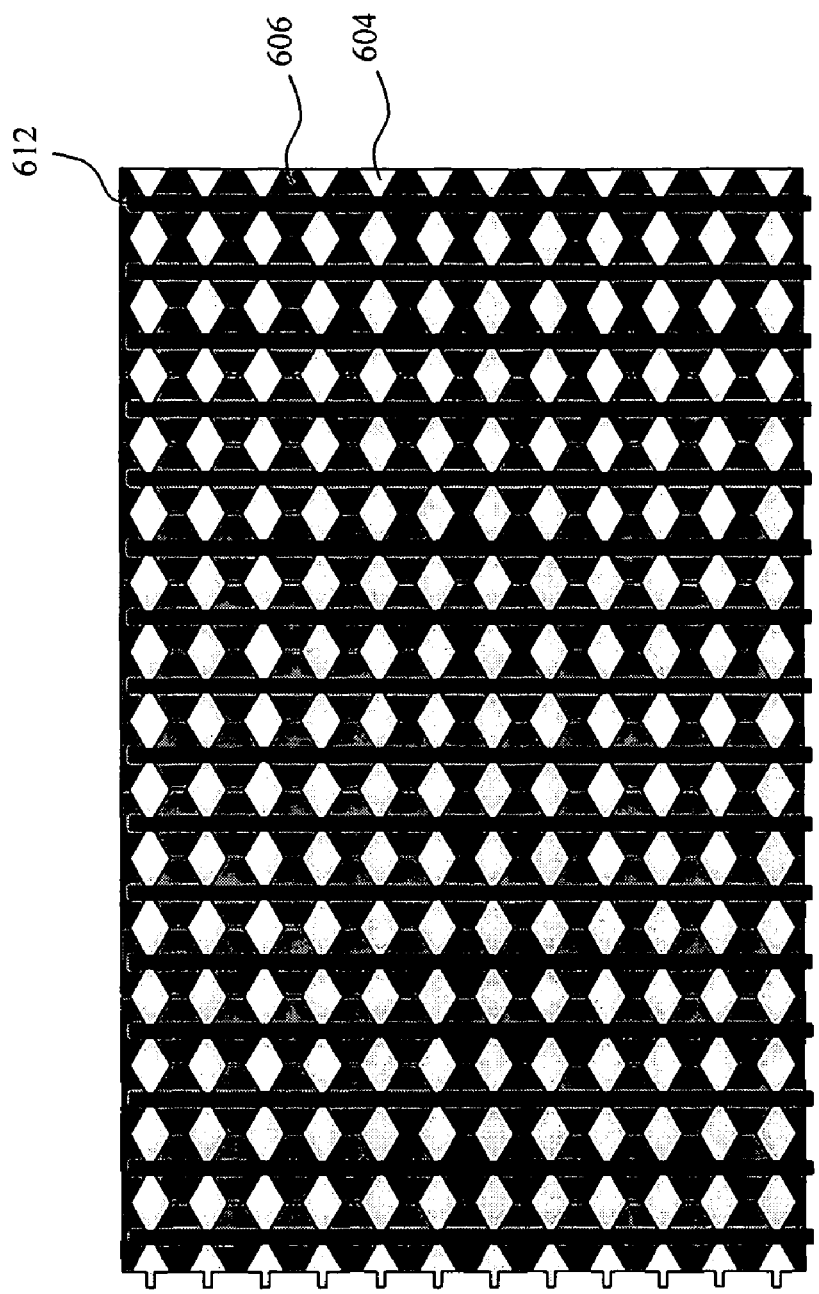
FIG. 7 is a structural diagram of a top layer of the PCB shown in FIG. 6.
Figure 8:
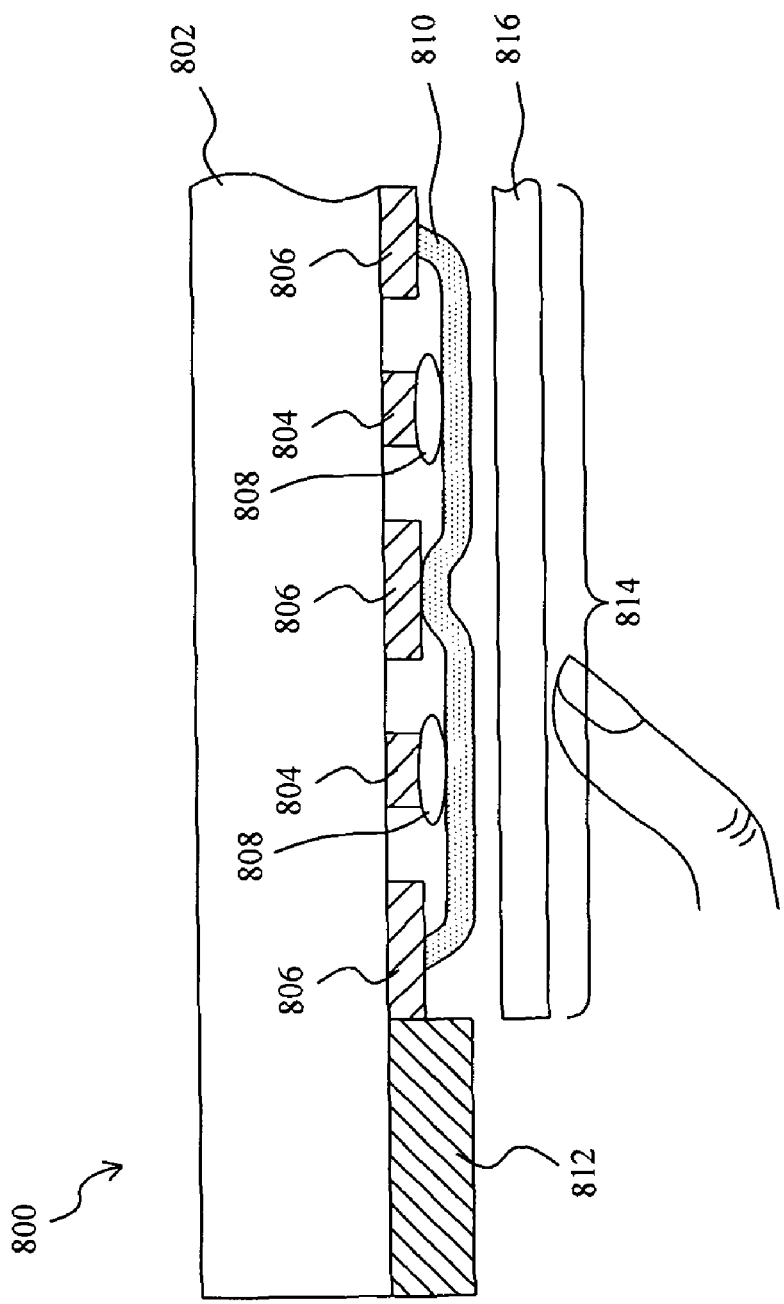
FIG. 8 is a cross-sectional view of a touchpad with single-layered PCB structure in first embodiment of the present invention.

FIG. 8 shows a cross-sectional view 800 of a touchpad with single-layered PCB structure according to the present invention, in which a PCB 802 includes a bottom layer having two areas, i.e., sensor area 814 and component area 812 on the periphery of the sensor area 814, in the sensor area 814 there are X-directional traces 804 as shown in FIG. 3A and Y-directional traces 806 as shown in FIG. 3B, and an insulator cover 816 covers on the sensor area 814 for providing an operation area. In this embodiment, for the purpose of avoiding short circuit resulted from the intersections of the X-directional traces 804 and the Y-directional traces 806, the Y-directional traces 806 in the sensor area 814 are not interconnected therebetween, resulting in the signals not able to transmit along the Y-direction in the sensor area 814. Therefore, by using carbon ink printing, carbon film wires 810 are formed in the sensor area 814 to interconnect the Y-directional traces 806, and an insulator 808 is provided between the X-directional traces 804 and the carbon film wires 810 for avoiding short circuit therebetween, such that the signals in the X-direction and Y-direction in the sensor area 814 could communicate well without interference therebetween. In another embodiment, the X-directional traces 804 are not interconnected instead, and the carbon film wires are used to interconnect the X-directional traces 804. Since the X-directional traces 804 and Y-directional traces 806 are directly connected to the component area 812, respectively, there will not need through-holes for connections.

Figure 9:
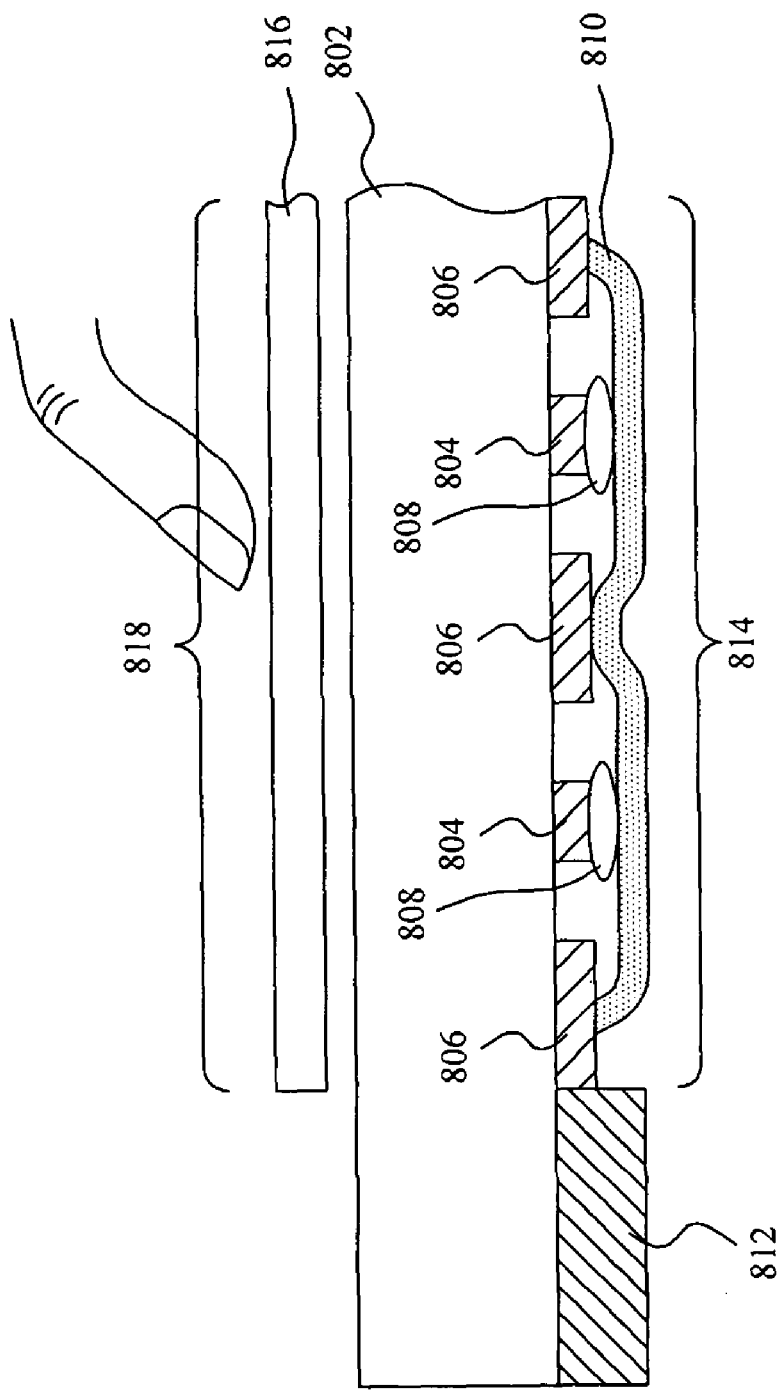
FIG. 9 is a cross-sectional view of a touchpad with single-layered PCB structure in second embodiment of the present invention.
Figure 10:
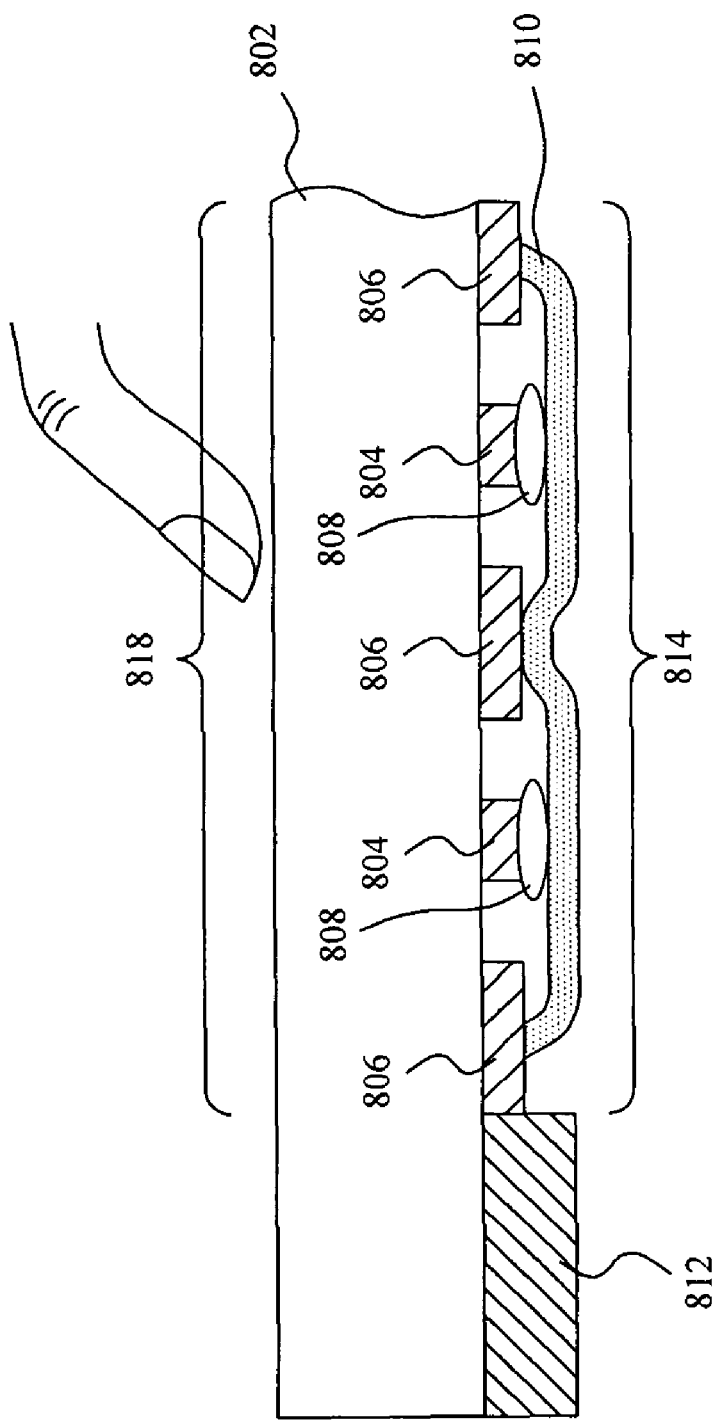
FIG. 10 is a cross-sectional view of a touchpad with single-layered PCB structure in third embodiment of the present invention.

Alternative, as shown in FIG. 9, since the sensor area 814 and the component area 812 are both in the bottom layer of the PCB 802, the top layer of the PCB 802 may have an insulator cover 816 attached thereon, at the location 818 facing to the sensor area 814, for providing an operation area. Preferably, as shown in FIG. 10, the top layer of the PCB 802 may directly provide an operation area at the location 818 facing to the sensor area 814, and thus an additional insulator cover is not needed. Moreover, with such touchpads having the operation area on or above the top layer of the PCB, the carbon film wires 810 in the bottom layer of the PCB will be never touched by users during their operations, and thus the touchpads will have longer lifetime.

Figure 11:
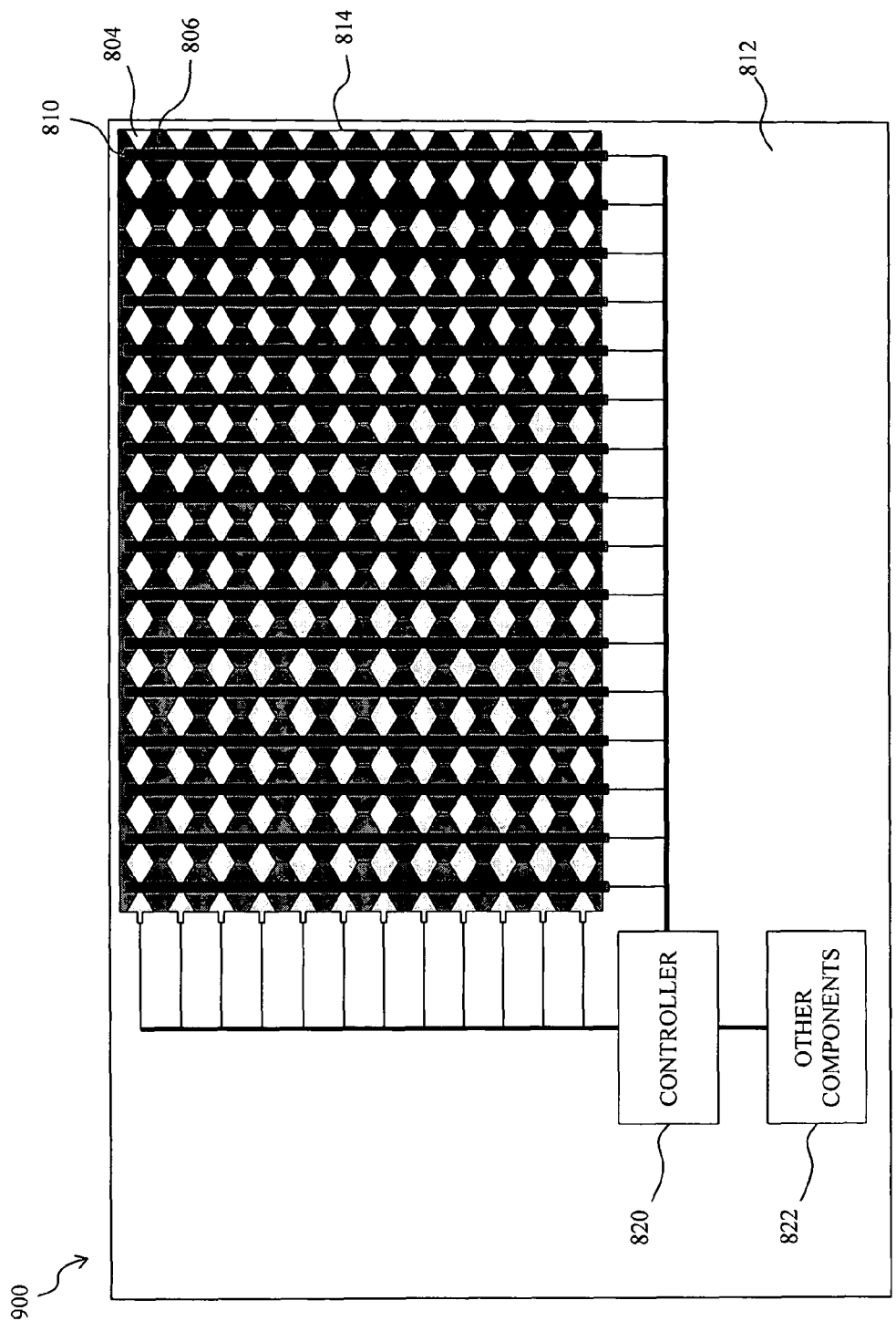
FIG. 11 is a structural diagram of a bottom layer of the PCB shown in FIG. 8.

In one embodiment, as a bottom layer structure 900 of a PCB in a touchpad with single-layered PCB structure shown in FIG. 11, there are a sensor area 814 and a component area 812 on the periphery of the sensor area 814. In the sensor area 814, there are provided with X-directional traces 804 and Y-directional traces 806 interconnected by carbon film wires 810. The traces 804 and 806 are directly connected to a controller 820 and further to other components 822 in the component area 812, respectively.

For a touchpad of the present invention, the optimal cost-efficiency is achieved owing to an effectively reduced manufacturing cost, resulted from the use of single-layered PCB structure and without through-holes, as well as a simplified circuit design due to the fact that the sensor area and the component area are provided in the same layer of the PCB. Additionally, if the operation area is provided on the top layer of the PCB, the adhesion of an insulator cover may be avoided, and the carbon film wires used for interconnecting the traces may not be worn out by user's operation. As a result, the cost is further reduced and the lifetime of the touchpad is further prolonged.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A touchpad with printed circuit board (PCB) structure, comprising:
    a single substrate PCB having a bottom surface;
    a sensor area disposed on the bottom surface, the sensor area including a plurality of first and second directional traces, whereby the first and second directional traces are interlaced and disposed in coplanar manner on the bottom surface; and
    a component area disposed in coplanar manner on the bottom surface peripherally outside the sensor area, the component area being operably coupled to the first and second directional traces.

2. The touchpad according to claim 1, further comprising an insulator cover over the sensor area for providing an operation area.

3. The touchpad according to claim 1, further comprising an insulator cover over a top surface of the PCB at a location facing to the sensor area for providing an operation area.

4. The touchpad according to claim 3, further comprising a plurality of carbon film wires in the sensor area for interconnecting one or more of the plurality of first or second directional traces.

5. The touchpad according to claim 1, wherein the PCB comprises a top surface having an operation area thereon at a location facing to the sensor area.

6. A touchpad with printed circuit board (PCB) structure, comprising:
    a single substrate PCB having a bottom surface;
    a sensor area disposed on the bottom surface, the sensor area including a plurality of first and second directional traces, whereby the first and second directional traces are interlaced and disposed in coplanar manner on the bottom surface;
    a component area disposed in coplanar manner on the bottom surface peripherally outside the sensor area, the component area being operably coupled to the first and second directional traces; and,
    a plurality of carbon film wires disposed in the sensor area each extending across to interconnect preselected ones of the first and second directional traces to a portion of the component area.

7. The touchpad according to claim 6, wherein the carbon film wires are each carbon ink printed to be connected to a preselected set of first directional traces and insulated from intervening ones of the second directional traces.

* * * * *